(12) United States Patent
Archer et al.

(10) Patent No.: US 8,296,590 B2
(45) Date of Patent: Oct. 23, 2012

(54) BUDGET-BASED POWER CONSUMPTION FOR APPLICATION EXECUTION ON A PLURALITY OF COMPUTE NODES

(75) Inventors: Charles J. Archer, Rochester, MN (US); Michael A. Blocksome, Rochester, MN (US); Amanda E. Peters, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 12/135,593

(22) Filed: Jun. 9, 2008

(65) Prior Publication Data

US 2009/0307036 A1    Dec. 10, 2009

(51) Int. Cl.
*G06F 1/32* (2006.01)
*G06F 1/00* (2006.01)
*G06F 1/26* (2006.01)

(52) U.S. Cl. .................. 713/320; 713/300; 713/324
(58) Field of Classification Search .................. 713/300, 713/320, 324
See application file for complete search history.

(56) References Cited

U.S. PATENT DOCUMENTS

| | | | |
|---|---|---|---|
| 5,850,539 A | 12/1998 | Cook et al. | |
| 6,760,852 B1 | 7/2004 | Gulick | |
| 6,804,632 B2 | 10/2004 | Orenstien et al. | |
| 7,251,737 B2 * | 7/2007 | Weinberger et al. | 713/320 |
| 7,281,146 B2 * | 10/2007 | Nalawadi et al. | 713/320 |
| 7,284,137 B2 | 10/2007 | Clark et al. | |
| 7,305,569 B2 | 12/2007 | Reilly | |
| 7,330,983 B2 | 2/2008 | Chaparro et al. | |
| 7,526,661 B2 | 4/2009 | Nakajima et al. | |
| 7,533,282 B2 * | 5/2009 | Ohneda et al. | 713/320 |
| 7,549,069 B2 | 6/2009 | Ishihara et al. | |
| 7,598,702 B2 * | 10/2009 | Walrath | 320/107 |
| 7,716,500 B2 * | 5/2010 | Esliger | 713/300 |
| 7,885,795 B2 | 2/2011 | Rasmussen et al. | |
| 8,004,234 B2 * | 8/2011 | Walrath | 320/107 |
| 2004/0073822 A1 * | 4/2004 | Greco et al. | 713/320 |
| 2004/0153867 A1 | 8/2004 | McAlinden et al. | |
| 2004/0168097 A1 | 8/2004 | Cook et al. | |
| 2004/0264652 A1 | 12/2004 | Erhart et al. | |
| 2005/0055590 A1 | 3/2005 | Farkas et al. | |
| 2005/0177327 A1 | 8/2005 | Banginwar et al. | |
| 2006/0253507 A1 | 11/2006 | Schank et al. | |
| 2006/0282838 A1 | 12/2006 | Gupta et al. | |

(Continued)

OTHER PUBLICATIONS

Office Action, U.S. Appl. No. 12/129,334, USPTO Mail Date May 29, 2008.

(Continued)

*Primary Examiner* — Thomas Lee
*Assistant Examiner* — Terrell Johnson
(74) *Attorney, Agent, or Firm* — Biggers & Ohanian, LLP

(57) ABSTRACT

Methods, apparatus, and products are disclosed for budget-based power consumption for application execution on a plurality of compute nodes that include: assigning an execution priority to each of one or more applications; executing, on the plurality of compute nodes, the applications according to the execution priorities assigned to the applications at an initial power level provided to the compute nodes until a predetermined power consumption threshold is reached; and applying, upon reaching the predetermined power consumption threshold, one or more power conservation actions to reduce power consumption of the plurality of compute nodes during execution of the applications.

15 Claims, 8 Drawing Sheets

U.S. PATENT DOCUMENTS

| | | | |
|---|---|---|---|
| 2007/0005998 | A1 | 1/2007 | Jain et al. |
| 2007/0033367 | A1 | 2/2007 | Sakarda et al. |
| 2007/0067657 | A1* | 3/2007 | Ranganathan et al. ....... 713/320 |
| 2007/0198864 | A1 | 8/2007 | Takase |
| 2007/0252552 | A1* | 11/2007 | Walrath ................ 320/107 |
| 2007/0300083 | A1* | 12/2007 | Goodrum et al. ........... 713/300 |
| 2008/0178029 | A1* | 7/2008 | McGrane et al. ........... 713/324 |
| 2008/0228462 | A1 | 9/2008 | Gross et al. |
| 2008/0234873 | A1 | 9/2008 | Gorbatov et al. |
| 2008/0313482 | A1 | 12/2008 | Karlapalem et al. |
| 2009/0024819 | A1 | 1/2009 | Fisher et al. |
| 2009/0187658 | A1 | 7/2009 | Williams et al. |
| 2009/0265568 | A1 | 10/2009 | Jackson |
| 2011/0029799 | A1* | 2/2011 | Walrath ................ 713/340 |

OTHER PUBLICATIONS

Office Action, U.S. Appl. No. 12/129,205, USPTO Mail Date May 29, 2008.
Office Action, U.S. Appl. No. 12/127,035, USPTO Mail Date Jan. 5, 2011.
Office Action, U.S. Appl. No. 12/135,593, USPTO Mail Date Mar. 30, 2011.
Office Action, U.S. Appl. No. 12/129,334, USPTO Mail Date Jun. 9, 2011.
Office Action, U.S. Appl. No. 12/129,205, USPTO Mail Date Jun. 3, 2011.
Office Action, U.S. Appl. No. 12/135,593, USPTO Mail Date Aug. 26, 2011.
Office Action, U.S. Appl. No. 12/167,302, USPTO Mail Date Oct. 12, 2011.
Office Action, U.S. Appl. No. 12/135,660, USPTO Mail Date Sep. 29, 2011.
Office Action, U.S. Appl. No. 12/129,319, USPTO Mail Date Sep. 30, 2011.
Notice of Allowance, U.S. Appl. No. 12/127,035, USPTO Mail Date Jun. 13, 2011.
Notice of Allowance, U.S. Appl. No. 12/129,223, USPTO Mail Date Sep. 6, 2011.
Final Office Action, U.S. Appl. No. 12/129,205, USPTO Mail Date Jan. 10, 2012.
Final Office Action, U.S. Appl. No. 12/129,334, USPTO Mail Date Jan. 24, 2012.
Notice of Allowance, U.S. Appl. No. 12/129,319, USPTO Mail Date Feb. 1, 2012.
Final Office Action, U.S. Appl. No. 12/135,604, USPTO Mail Date Apr. 26, 2012.
Office Action, U.S. Appl. No. 12/135,593, USPTO Mail Date Feb. 15, 2012.
Notice of Allowance, U.S. Appl. No. 12/135,660, USPTO Mail Date Jun. 7, 2012.
Notice of Allowance, U.S. Appl. No. 13/277,350, USPTO Mail Date Dec. 14, 2011.

* cited by examiner

BUDGET-BASED POWER CONSUMPTION FOR APPLICATION EXECUTION ON A PLURALITY OF COMPUTE NODES

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for budget-based power consumption for application execution on a plurality of compute nodes.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output ('I/O') devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute applications that include both parallel algorithms and serial algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the algorithms of an application are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource—the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are organized in a binary tree arrangement: each node has a parent and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, such as, for example, an allgather, allreduce, broadcast, scatter, and so on.

Using compute nodes connected through such data communications networks, a parallel computer is often utilized to execute a set of applications. Because different applications typically instruct the compute nodes to utilize the compute node hardware in different ways, the compute nodes' power consumption may vary as the compute node executes different applications. If applications resulting in high compute node power consumption are executed at inopportune times such as, for example, when power prices for power usage above a particular power usage threshold are extremely high, then application execution may waste valuable business resources.

SUMMARY OF THE INVENTION

Methods, apparatus, and products are disclosed for budget-based power consumption for application execution on a plurality of compute nodes that include: assigning an execution priority to each of one or more applications; executing, on the plurality of compute nodes, the applications according to the execution priorities assigned to the applications at an initial power level provided to the compute nodes until a predetermined power consumption threshold is reached; and applying, upon reaching the predetermined power consumption threshold, one or more power conservation actions to reduce power consumption of the plurality of compute nodes during execution of the applications.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
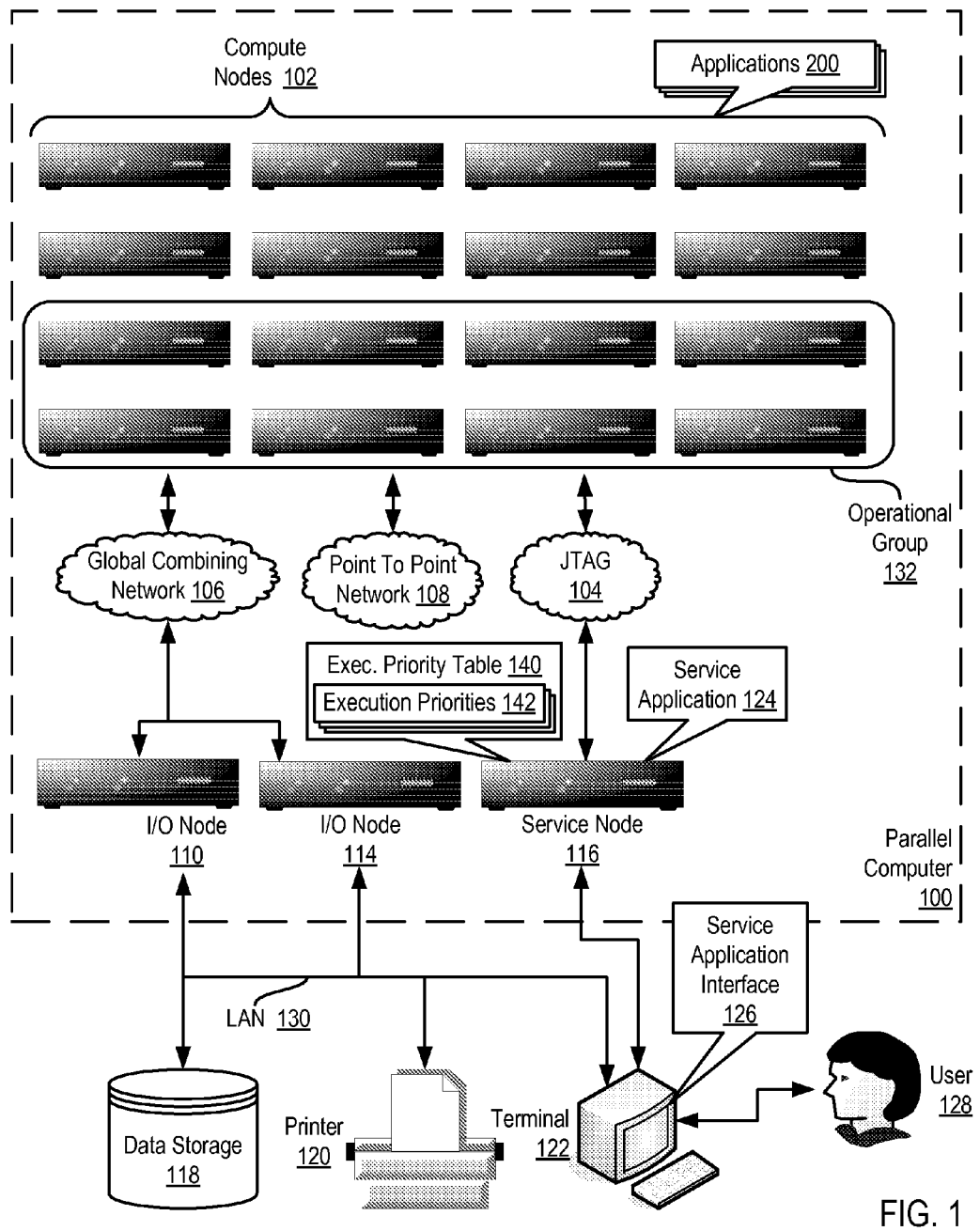
FIG. 1 illustrates an exemplary system for budget-based power consumption for application execution on a plurality of compute nodes according to embodiments of the present invention.

Exemplary methods, apparatus, and computer program products for budget-based power consumption for application execution on a plurality of compute nodes according to embodiments of the present invention are described with reference to the accompanying drawings, beginning with FIG. 1. FIG. 1 illustrates an exemplary system for budget-based power consumption for application execution on a plurality of compute nodes (100) according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102) that execute a plurality of applications (200). Each application (200) of FIG. 1 is a set of computer program instructions that provide user-level data processing.

Each compute node (102) of FIG. 1 may include a plurality of processors for use in executing an application on the parallel computer (100) according to embodiments of the present invention. The processors of each compute node (102) in FIG. 1 are operatively coupled to computer memory such as, for example, random access memory ('RAM'). Each compute node (102) may operate in several distinct modes that affect the relationship among the processors and the memory on that node such as, for example, serial processing mode or parallel processing mode. The mode in which the compute nodes operate is generally set during the node's boot processes and does not change until the node reboots.

In serial processing mode, often referred to a 'virtual node mode,' the processors of a compute node operate independently of one another, and each processor has access to a partition of the node's total memory that is exclusively dedicated to that processor. For example, if a compute node has four processors and two Gigabytes (GB) of RAM, when operating in serial processing mode, each processor may process a thread independently of the other processors at that node, and each processor may access a 512 Megabyte (MB) portion of that node's total 2 GB of RAM.

In parallel processing mode, often referred to as 'symmetric multi-processing mode,' one of the processors acts as a master, and the remaining processors serve as slaves to the master processor. Each processor has access to the full range of computer memory on the compute node. Continuing with the exemplary node above having four processors and 2 GB of RAM, for example, each slave processor may cooperatively process threads spawned from the master processor, and all of the processors have access to the node's entire 2 GB of RAM.

The compute nodes (102) are coupled for data communications by several independent data communications networks including a Joint Test Action Group ('JTAG') network (104), a global combining network (106) which is optimized for collective operations such as for example a tree network, and a point to point network (108) which is optimized point to point operations such as for example a torus network. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes and the hardware components of the compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

In the example of FIG. 1, the service application (124) includes a set of computer program instructions capable of budget-based power consumption for application execution on a plurality of compute nodes (102) according to embodiments of the present invention. The service application (124) of FIG. 1 operates generally for budget-based power consumption for application execution on a plurality of compute nodes (102) according to embodiments of the present invention by: assigning an execution priority (142) to each of one or more applications (200); executing, on the plurality of compute nodes (102), the applications (200) according to the execution priorities (142) assigned to the applications (200) at an initial power level provided to the compute nodes (102) until a predetermined power consumption threshold is reached; and applying, upon reaching the predetermined power consumption threshold, one or more power conservation actions to reduce power consumption of the plurality of compute nodes (102) during execution of the applications (200).

The execution priority (142) assigned to each application (200) of FIG. 1 is a value that specifies the order in which each application should be executed relative to the execution of the other applications. The execution priority (142) may be implemented as an ordinal value such as, for example, '1,' '2,' or '3,' such that applications which are assigned lower ordinal values are executed before application which are assigned higher ordinal values. In some other embodiments, the execution priority (142) may be implemented as a floating point value within a range such as, for example, a range between '0' and '1' such that applications which are assigned floating point values closer to the upper end of the range are executed before application which are assigned floating point values closer to the lower end of the range. In the example of FIG. 1, the execution priorities (142) for each application are stored in an execution priority table (140).

A power conservation action is a procedure that reduces the amount of power consumed by one or more compute nodes executing an application. A power conservation action may be implemented by altering the configuration of the hardware components of the compute nodes such as, for example, reducing the power provided to the plurality of the compute nodes or reducing the operating speeds of the nodes' hardware components, thereby reducing the power consumed by the compute nodes. Because different applications utilize compute node hardware in different ways, which results in different power consumption for different applications, a power conservation action may be implemented by merely switching the order in which applications are executed. For example, an application that results in low power consumption may be executed instead of an application that results in high power consumption. Such a power consumption action may be carried out by assigning a new execution priority to one or more of the applications upon reaching the predetermined power consumption threshold.

The predetermined power consumption threshold is a benchmark value used to determine whether the particular set of application (200) to be executed by the parallel computer (100) has exceeded a particular level of power consumption. That is, the predetermined power consumption threshold represent a 'power budget' for the set of applications (200) executing on the compute nodes (102). Although power consumption may be measured in a variety of ways, one exemplary manner of measurement is to track the amount of energy consumed by the compute nodes over a particular period of time. In such an example, the predetermined power consumption threshold may represent a particular amount of energy consumed by the compute nodes over a particular period of time. When the power consumption of the compute nodes has reached such a predetermined power consumption threshold, then one or more power conservation actions may be performed.

The predetermined power consumption threshold, or power budget, for the applications (200) of FIG. 1 may be configured by a system administrator based certain pricing tiers for power consumption. For example, a power company may charge the system administrator one price for power consumption up to a certain power consumption threshold, another price for power consumption up to an additional power consumption threshold, and still another price for power consumption up to different power consumption threshold. As such, the service application (124) of FIG. 1 may also operate generally for budget-based power consumption for application execution on a plurality of compute nodes (102) according to embodiments of the present invention by: accepting a higher price for power than a current price upon reaching the predetermined power consumption threshold. The service application (124) of FIG. 1 may also operate generally for budget-based power consumption for application execution on a plurality of compute nodes (102) according to embodiments of the present invention by: ordering additional power upon reaching the predetermined power consumption threshold and establishing a new predetermined power consumption threshold in dependence upon the additional power ordered.

In the example of FIG. 1, the plurality of compute nodes (102) are implemented in a parallel computer (100) and are connected together using a plurality of data communications networks (104, 106, 108). The point to point network (108) is optimized for point to point operations. The global combining network (106) is optimized for collective operations. Although budget-based power consumption for application execution on a plurality of compute nodes according to embodiments of the present invention is described above in terms of an architecture for a parallel computer, readers will note that such an embodiment is for explanation only and not for limitation. In fact, budget-based power consumption for application execution on a plurality of compute nodes according to embodiments of the present invention may be implemented using a variety of computer system architectures composed of a plurality of nodes network-connected together, including for example architectures for a cluster of nodes, a distributed computing system, a grid computing system, and so on.

The arrangement of nodes, networks, and I/O devices making up the exemplary system illustrated in FIG. 1 are for explanation only, not for limitation of the present invention. Data processing systems capable of budget-based power consumption for application execution on a plurality of compute nodes according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of budget-based power consumption for application execution on a plurality of compute nodes according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Figure 2:
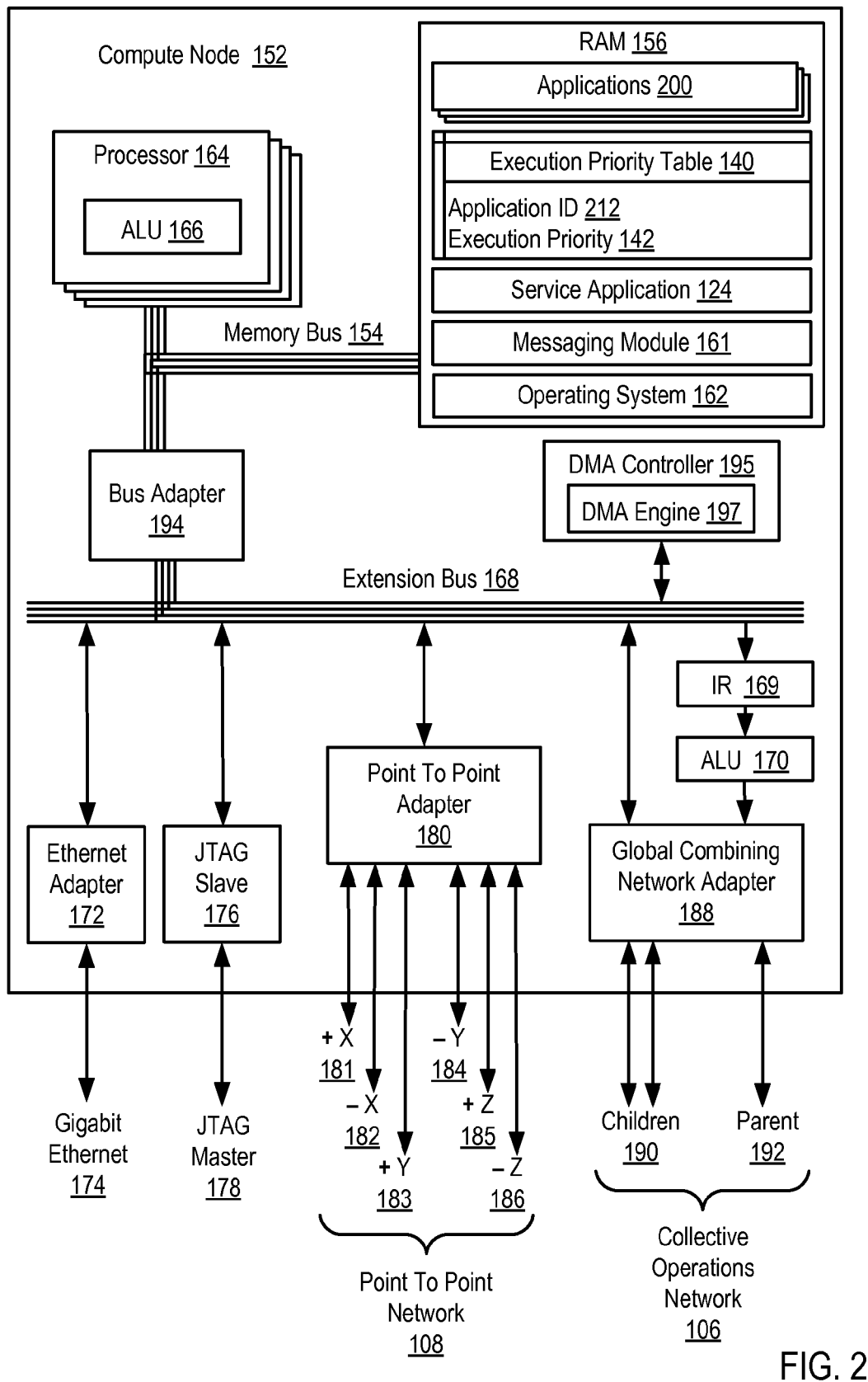
FIG. 2 sets forth a block diagram of an exemplary compute node useful in a parallel computer capable of budget-based power consumption for application execution on a plurality of compute nodes according to embodiments of the present invention.

Budget-based power consumption for application execution on a plurality of compute nodes according to embodiments of the present invention may be generally implemented on a parallel computer, among other types of exemplary systems. In fact, such computers may include thousands of such compute nodes and service nodes. Each compute node and service node is in turn itself a kind of computer composed of one or more computer processors, its own computer memory, and its own input/output adapters. For further explanation, therefore, FIG. 2 sets forth a block diagram of an exemplary compute node (152) useful in a parallel computer capable of budget-based power consumption for application execution on a plurality of compute nodes according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) of FIG. 2 is a plurality of applications (200). Each application (200) is a set of computer program instructions that provide user-level data processing.

Also stored in RAM (156) of FIG. 2 is an execution priority table (140). The execution priority table (140) is a data structure that associates execution priorities with applications. Each record of the execution priority table (140) includes an application identifier (212) and an execution priority (142). The application identifier (212) of FIG. 2 specifies a particular application executing on the compute nodes of a parallel computer. The execution priority (142) of FIG. 2 specifies the order in which the associated application should be executed relative to the execution of the other applications.

Also stored in RAM (156) of FIG. 2 is a service application (124), that is, a set of computer program instructions capable of budget-based power consumption for application execution on a plurality of compute nodes according to embodiments of the present invention. The service application (124) of FIG. 2 operates generally for budget-based power consumption for application execution on a plurality of compute nodes according to embodiments of the present invention by: assigning an execution priority (142) to each of one or more applications (200); executing, on the plurality of compute nodes, the applications (200) according to the execution priorities (142) assigned to the applications (200) at an initial power level provided to the compute nodes until a predetermined power consumption threshold is reached; and applying, upon reaching the predetermined power consumption threshold, one or more power conservation actions to reduce power consumption of the plurality of compute nodes during execution of the applications (200). The service application (124) of FIG. 2 may also operate generally for budget-based power consumption for application execution on a plurality of compute nodes according to embodiments of the present invention by: accepting a higher price for power than a current price upon reaching the predetermined power consumption threshold. The service application (124) of FIG. 2 may also operate generally for budget-based power consumption for application execution on a plurality of compute nodes according to embodiments of the present invention by: ordering additional power upon reaching the predetermined power consumption threshold and establishing a new predetermined power consumption threshold in dependence upon the additional power ordered.

Also stored in RAM (156) is a messaging module (161), a library of computer program instructions that carry out parallel communications among compute nodes, including point to point operations as well as collective operations. User-level applications such as application (200) effect data communications with other applications running on other compute nodes by calling software routines in the messaging modules (161). A library of parallel communications routines may be developed from scratch for use in systems according to embodiments of the present invention, using a traditional programming language such as the C programming language, and using traditional programming methods to write parallel communications routines. Alternatively, existing prior art libraries may be used such as, for example, the 'Message Passing Interface' ('MPI') library, the 'Parallel Virtual Machine' ('PVM') library, and the Aggregate Remote Memory Copy Interface ('ARMCI') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft Vista™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for budget-based power consumption for application execution on a plurality of compute nodes according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in budget-based power consumption for application execution on a plurality of compute nodes according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the messaging module (161).

Figure 3A:
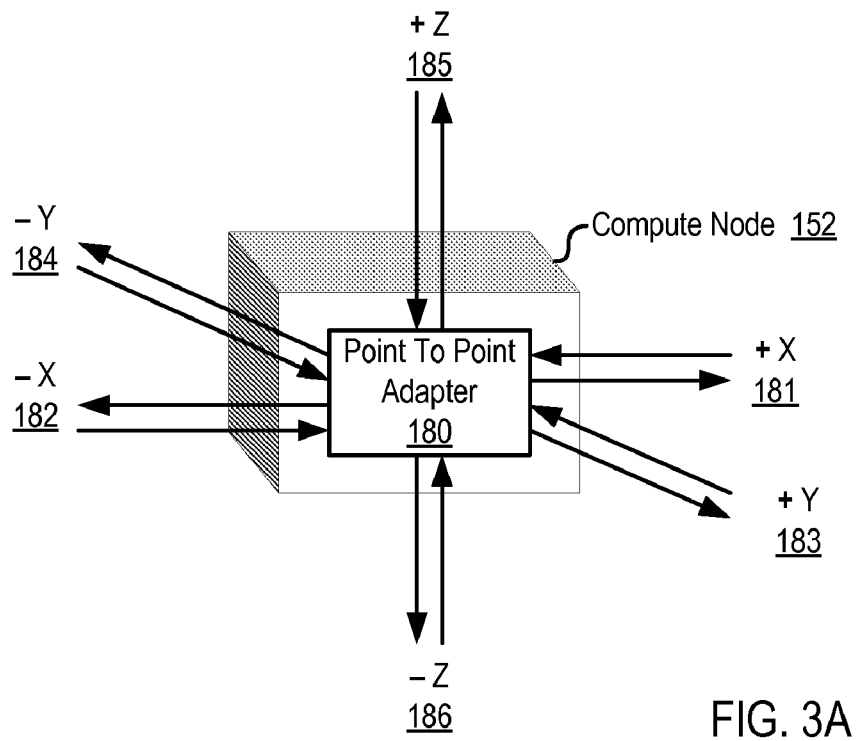
FIG. 3A illustrates an exemplary Point To Point Adapter useful in systems capable of budget-based power consumption for application execution on a plurality of compute nodes according to embodiments of the present invention.

For further explanation, FIG. 3A illustrates an exemplary Point To Point Adapter (180) useful in systems capable of budget-based power consumption for application execution on a plurality of compute nodes according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
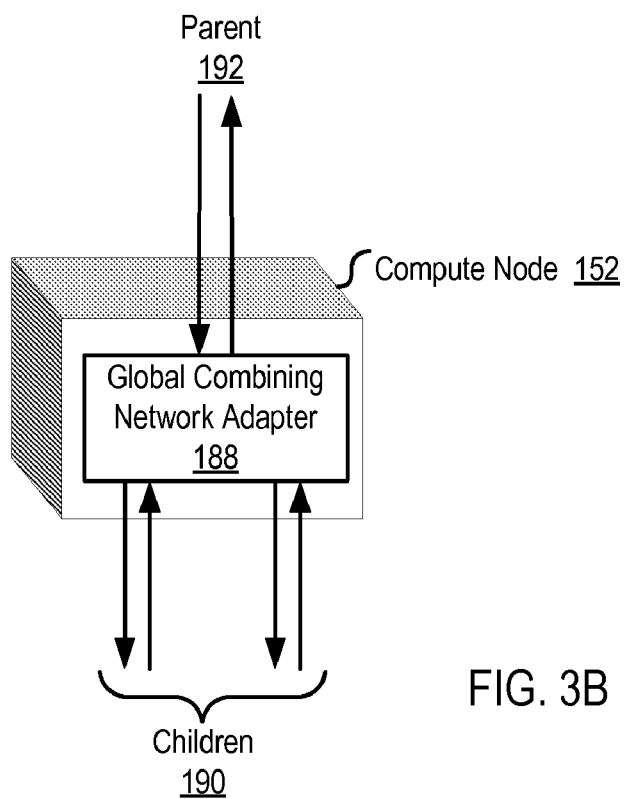
FIG. 3B illustrates an exemplary Global Combining Network Adapter useful in systems capable of budget-based power consumption for application execution on a plurality of compute nodes according to embodiments of the present invention.

For further explanation, FIG. 3B illustrates an exemplary Global Combining Network Adapter (188) useful in systems capable of budget-based power consumption for application execution on a plurality of compute nodes according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
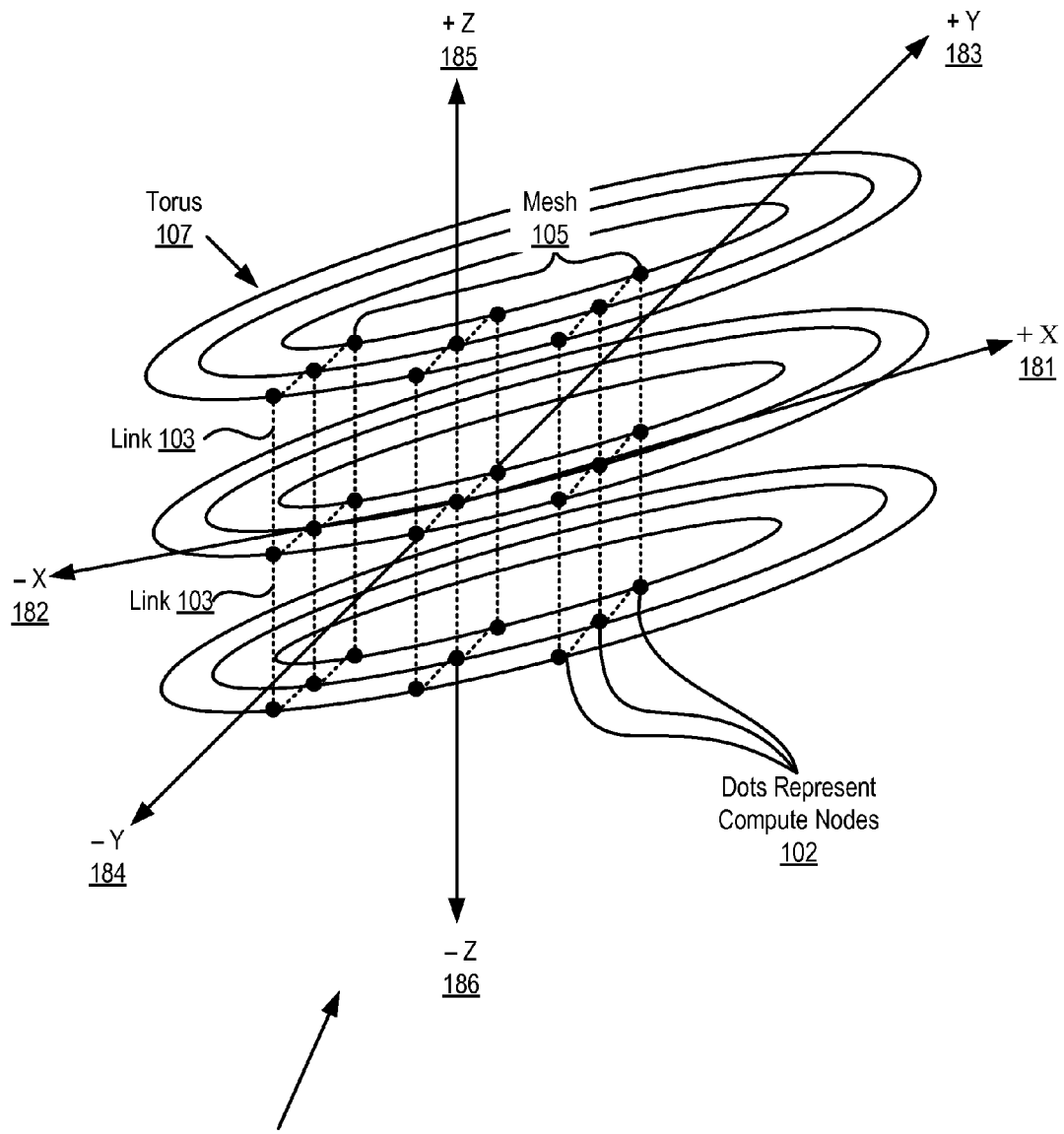
FIG. 4 sets forth a line drawing illustrating an exemplary data communications network optimized for point to point operations useful in systems capable of budget-based power consumption for application execution on a plurality of compute nodes in accordance with embodiments of the present invention.

For further explanation, FIG. 4 sets forth a line drawing illustrating an exemplary data communications network (108) optimized for point to point operations useful in systems capable of budget-based power consumption for application execution on a plurality of compute nodes in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in budget-based power consumption for application execution on a plurality of compute nodes in accordance with embodiments of the present invention may contain only a few compute nodes or may contain thousands of compute nodes.

Figure 5:
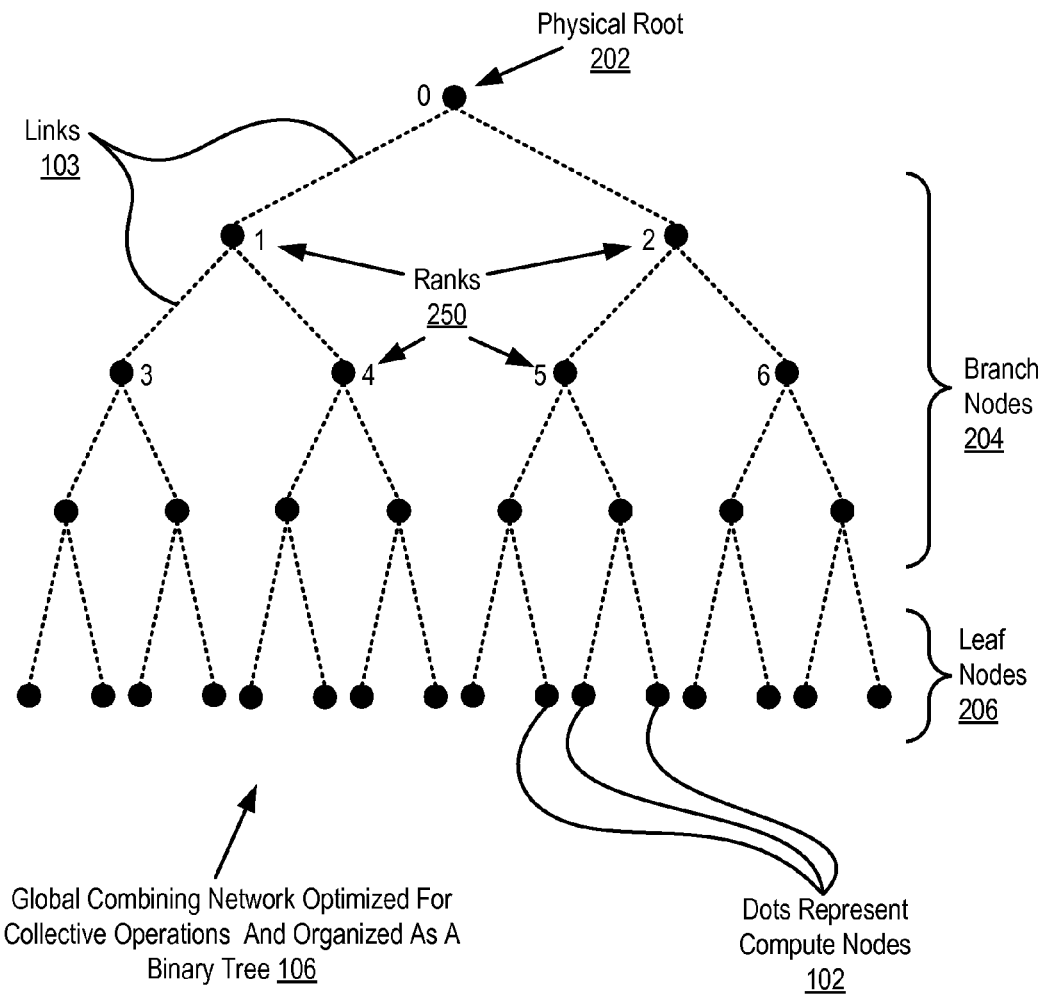
FIG. 5 sets forth a line drawing illustrating an exemplary data communications network optimized for collective operations useful in systems capable of budget-based power consumption for application execution on a plurality of compute nodes in accordance with embodiments of the present invention.

For further explanation, FIG. 5 sets forth a line drawing illustrating an exemplary data communications network (106) optimized for collective operations useful in systems capable of budget-based power consumption for application execution on a plurality of compute nodes in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for budget-based power consumption for application execution on a plurality of compute nodes in accordance with embodiments of the present invention may contain only a few compute nodes or may contain thousands of compute nodes.

Figure 6:
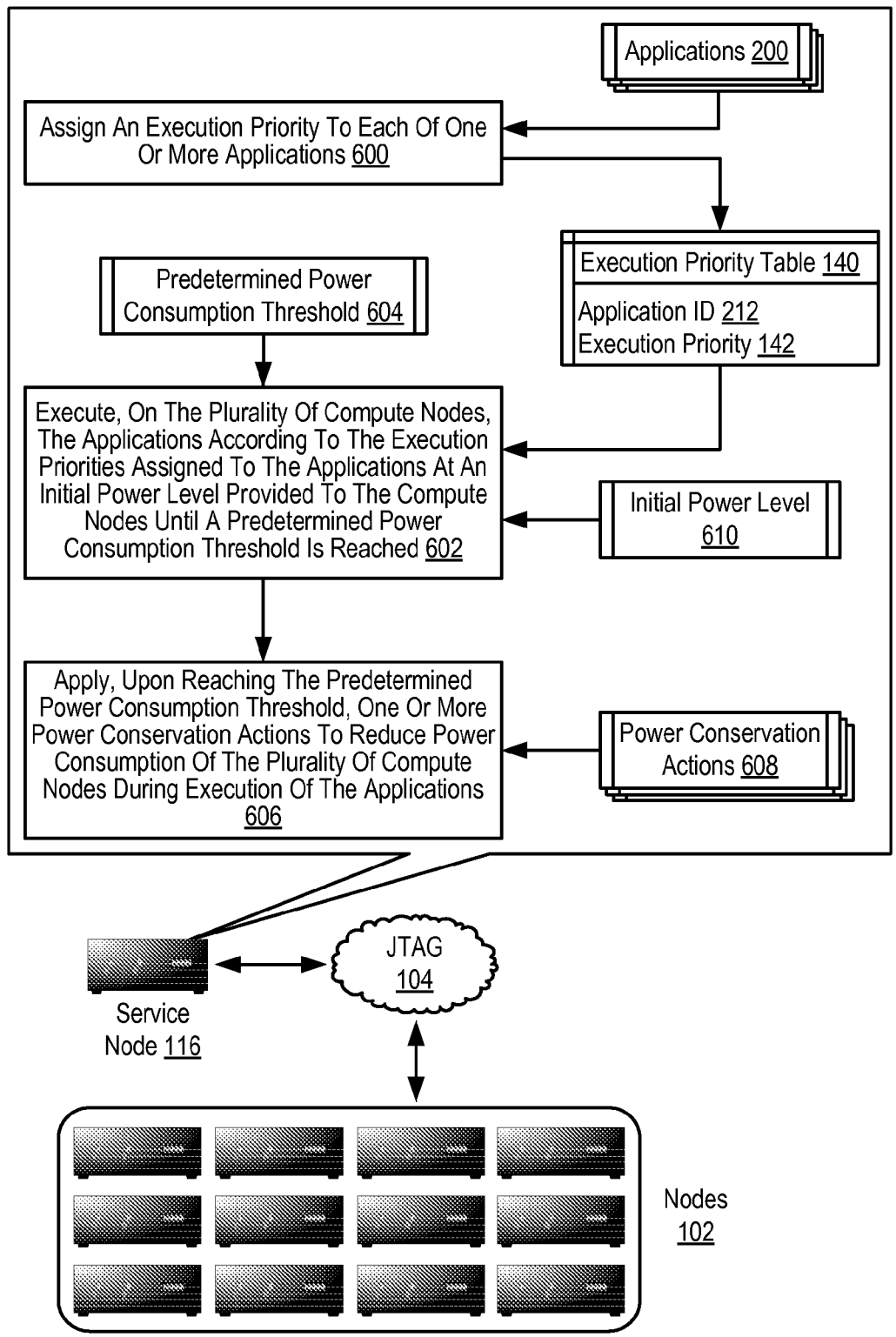
FIG. 6 sets forth a flow chart illustrating an exemplary method for budget-based power consumption for application execution on a plurality of compute nodes according to embodiments of the present invention.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank. For further explanation, FIG. 6 sets forth a flow chart illustrating an exemplary method for budget-based power consumption for application execution on a plurality of compute nodes (102) according to embodiments of the present invention. Budget-based power consumption for application execution on a plurality of compute nodes (102) according to the method of FIG. 6 is carried out on a service node (116). The service node (116) connects to the compute nodes (102) through a JTAG network (104). In the example of FIG. 6, the compute nodes (102) are connected together for data communications using a plurality of data communications networks. At least one of the data communications networks is optimized for point to point operations such as, for example, the torus network described above, and at least one of the data communications is optimized for collective operations such as, for example, the tree network described above.

The method of FIG. 6 includes assigning (600) an execution priority (142) to each of one or more applications (200). The execution priority (142) of FIG. 6 represents a value that specifies the order in which each application should be executed relative to the execution of the other applications. In the example of FIG. 6, the execution priority (142) for each application (200) is determined by the system administrators executing the applications (200) on the compute nodes (102). In other embodiments, however, the execution priorities (142) for the applications (200) may be set by the application developer writing the applications (200), the user of the applications (200) requesting that the system administrator execute the applications (200), or some other entity as will occur to those of skill in the art. In the method of FIG. 6, assigning (600) an execution priority (142) to each of one or more applications (200) may be carried out by receiving an execution priority (142) for each application (200) from a system administrator through a user interface and storing the execution priority (142) in association with the particular application (200) in an execution priority table (140).

The execution priority table (140) of FIG. 6 is a data structure that associates execution priorities with applications. Each record of the execution priority table (140) includes an application identifier (212) and an execution priority (142). The application identifier (212) of FIG. 6 specifies a particular application executing on the compute nodes of a parallel computer. The execution priority (142) of FIG. 6 specifies the order in which the associated application should be executed relative to the execution of the other applications. The execution priority (142) may be implemented as an ordinal value such as, for example, '1,' '2,' or '3,' such that applications which are assigned lower ordinal values are executed before application which are assigned higher ordinal values. In some other embodiments, the execution priority (142) may be implemented as a floating point value within a range such as, for example, a range between '0' and '1' such that applications which are assigned floating point values closer to the upper end of the range are executed before application which are assigned floating point values closer to the lower end of the range.

The method of FIG. 6 also includes executing (602), on the plurality of compute nodes (102), the applications (200) according to the execution priorities (142) assigned to the applications (200) at an initial power level (610) provided to the compute nodes (102) until a predetermined power consumption threshold (604) is reached. The initial power level (610) of FIG. 6 represents the amount of power consumed by the compute nodes (102) when the compute nodes begin processing the applications (200). In the method of FIG. 6, executing (602) the applications (200) according to the execution priorities (142) may be carried out by identifying the application (200) having the highest execution priority (142), configuring the compute nodes (102) with that application (200) through the JTAG network (104), and instructing the compute nodes to begin execution of that application (200). Then, in the method of FIG. 6, executing (602) the applications (200) according to the execution priorities (142) may be carried out by identifying the application (200) having the next highest execution priority (142), configuring the compute nodes (102) with that application (200) through the JTAG network (104), and instructing the compute nodes to begin execution of that application (200). Executing (602) the applications (200) according to the execution priorities (142) in the method of FIG. 6 may then continue in such a manner until all of the applications (600) have been executed or until a predetermined power consumption threshold (604) is reached.

The service node (116) of FIG. 6 may determine whether the predetermined power consumption threshold (604) is reached by measuring the power consumed by the compute nodes (102) from the point at which the nodes (102) begin executing the applications (200). The service node (116) may measure the power consumed by the compute nodes (102) using sensors in the voltage regulators (not shown) providing power to the nodes (102). The service node (116) may connect to those voltage regulators through the JTAG network (104). Of course, readers will note that other ways as will occur to those of skill in the art of determining whether the predetermined power consumption threshold (604) is reached may also be useful in embodiments of the present invention.

The method of FIG. 6 includes applying (606), upon reaching the predetermined power consumption threshold (604), one or more power conservation actions (608) to reduce power consumption of the plurality of compute nodes (102) during execution of the applications (200). The power conservation actions (608) of FIG. 6 represent procedures that reduce the amount of power consumed by one or more compute nodes (102) executing an application. Applying (606) one or more power conservation actions (608) according to the method of FIG. 6 may be carried out by reducing the power provided to the plurality of the compute nodes (102) upon reaching the predetermined power consumption threshold (604). The service node (116) of FIG. 6 may reduce the power provided to the plurality of the compute nodes (102) by reducing the operating speed of the hardware components of the nodes (102).

Readers will note that the different applications (102) utilize compute node hardware in different ways, thereby resulting in different power consumption for the different applications (200). Applying (606) one or more power conservation actions (608) according to the method of FIG. 6 may therefore be carried out by assigning a new execution priority to one or more of the applications (200) upon reaching the predetermined power consumption threshold (604). For example, consider that a system administrator desires to execute three applications. The first application has a high power consumption, the second application has a medium power consumption, and the third application has a low power consumption. Further consider that the system administrator has purchased a particular amount of power at a discount price, and that the system administrator assigns highest execution priority to the first application, the second highest execution priority to the second application, and the third highest execution priority to the third application. Assume that after executing the first application, the compute nodes use up all of the power that the system administrator purchased at a discount. To reduce costs, the system administrator may reassign execution priorities so that the third application executes after the first application and forgo execution of the second application until more power may be purchased at a discount.

Figure 7:
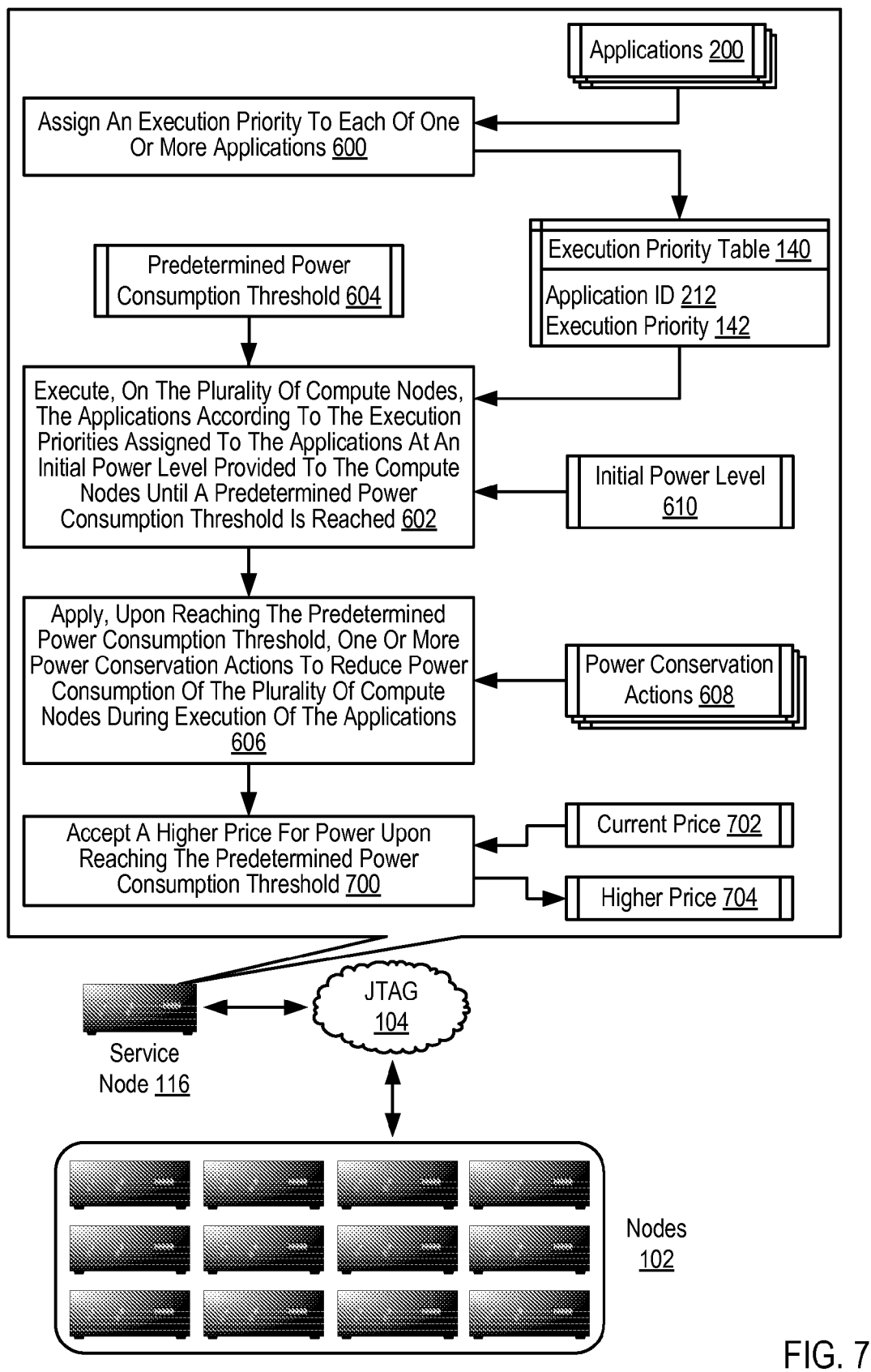
FIG. 7 sets forth a flow chart illustrating a further exemplary method for budget-based power consumption for application execution on a plurality of compute nodes according to embodiments of the present invention.

As discussed in the example above, the power budget for a set of applications executing on the compute nodes of a parallel computer may often be based on a particular discount price associated with a particular amount of power consumption. For further explanation, consider FIG. 7 that sets forth a flow chart illustrating a further exemplary method for budget-based power consumption for application execution on a plurality of compute nodes according to embodiments of the present invention. Budget-based power consumption for application execution on a plurality of compute nodes (102) according to the method of FIG. 7 is carried out on a service node (116). The service node (116) connects to the compute nodes (102) through a JTAG network (104). In the example of FIG. 7, the compute nodes (102) are connected together for data communications using a plurality of data communications networks. At least one of the data communications networks is optimized for point to point operations such as, for example, the torus network described above, and at least one of the data communications is optimized for collective operations such as, for example, the tree network described above.

The method of FIG. 7 is similar to the method of FIG. 6. That is, the method of FIG. 7 includes: assigning (600) an execution priority (142) to each of one or more applications (200); executing (602), on the plurality of compute nodes (102), the applications (200) according to the execution priorities (142) assigned to the applications (200) at an initial power level (610) provided to the compute nodes (102) until a predetermined power consumption threshold (604) is reached; and applying (606), upon reaching the predetermined power consumption threshold (604), one or more power conservation actions (608) to reduce power consumption of the plurality of compute nodes (102) during execution of the applications (200). In the example of FIG. 7, the execution priorities (142) of the applications (200) are stored in an execution priority table (140). Each record of the execution priority table (140) includes an application identifier (212) and the execution priority (142) for the associated application.

The method of FIG. 7 also includes accepting (700) a higher price (704) for power than a current price (702) upon reaching the predetermined power consumption threshold (604). The current price (702) of FIG. 7 may represent a price for a certain amount of power that the system administrator purchased in advance at a volume discount. The higher price (704) of FIG. 7 represents any price higher than the current price (702) and may represent the retail price. Readers will note, however, that the current price (702) may instead represent a retail price for power while the higher price (704) represents a price higher than the current price (702) because a certain financial penalty is imposed by the power supplier for consuming power in excess of the predetermined power consumption threshold (604). In embodiments where a power supplier bills for power consumption in arrears, accepting (700) a higher price (704) for power than a current price (702) according to the method of FIG. 7 may merely be carried out by continuing to consume power provided by the power supplier. In some other embodiments where a power consumer prepays for power consumption, accepting (700) a higher price (704) for power than a current price (702) according to the method of FIG. 7 may be carried out by prepaying for power consumed by compute nodes (102) beyond the predetermined power consumption threshold (604) and continuing to consume power after the predetermined power consumption threshold (604) is reached.

Figure 8:
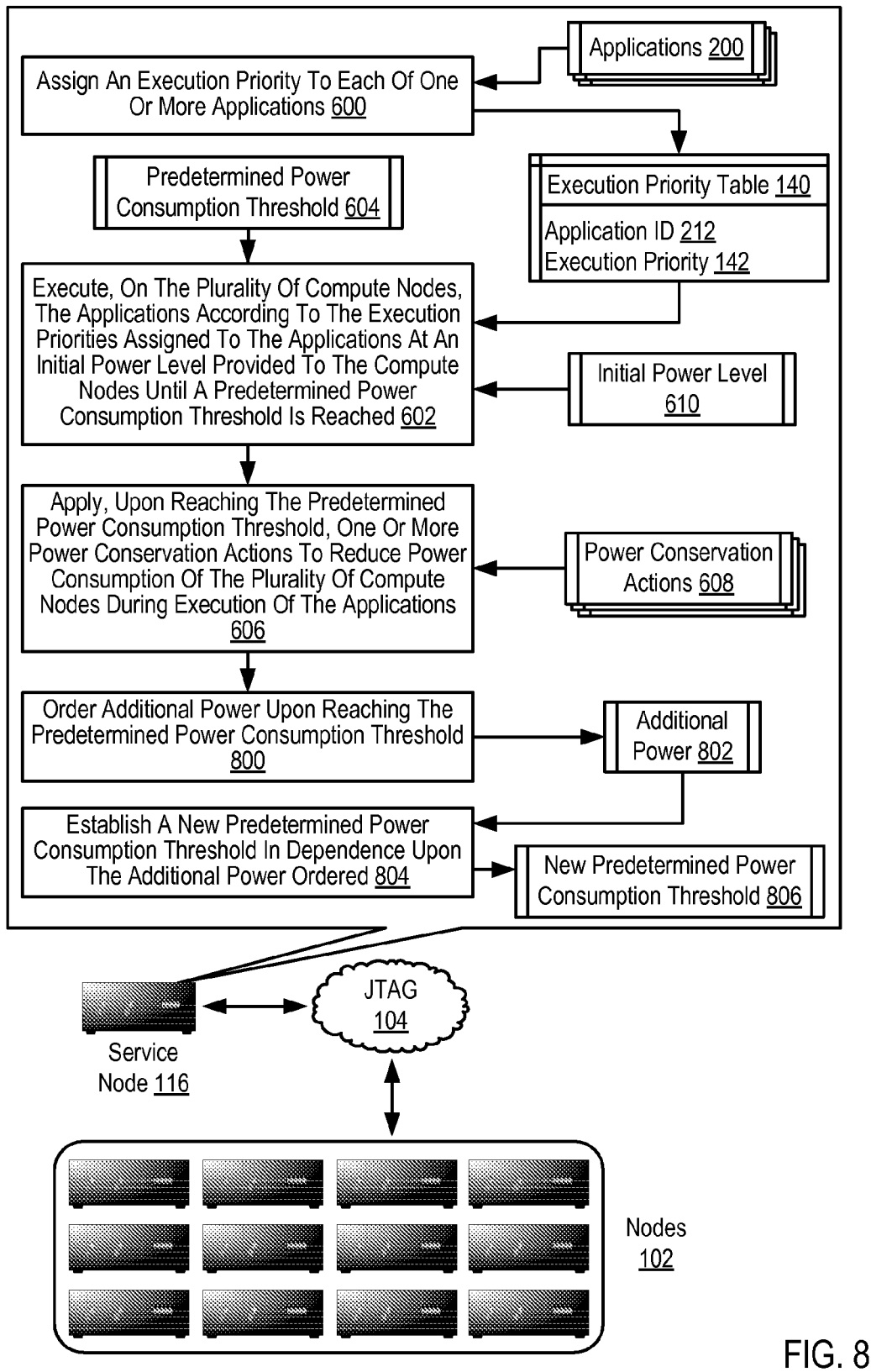
FIG. 8 sets forth a flow chart illustrating a further exemplary method for budget-based power consumption for application execution on a plurality of compute nodes according to embodiments of the present invention.

After the power budget for a set of applications is reached, a system administrator may order additional power and establish a new power budget for the applications. For further explanation, consider FIG. 8 that sets forth a flow chart illustrating a further exemplary method for budget-based power consumption for application execution on a plurality of compute nodes according to embodiments of the present invention. Budget-based power consumption for application execution on a plurality of compute nodes (102) according to the method of FIG. 8 is carried out on a service node (116). The service node (116) connects to the compute nodes (102) through a JTAG network (104). In the example of FIG. 8, the compute nodes (102) are connected together for data communications using a plurality of data communications networks. At least one of the data communications networks is optimized for point to point operations such as, for example, the torus network described above, and at least one of the data communications is optimized for collective operations such as, for example, the tree network described above.

The method of FIG. 8 is similar to the method of FIG. 6. That is, the method of FIG. 8 includes: assigning (600) an execution priority (142) to each of one or more applications (200); executing (602), on the plurality of compute nodes (102), the applications (200) according to the execution priorities (142) assigned to the applications (200) at an initial power level (610) provided to the compute nodes (102) until a predetermined power consumption threshold (604) is reached; and applying (606), upon reaching the predetermined power consumption threshold (604), one or more power conservation actions (608) to reduce power consumption of the plurality of compute nodes (102) during execution of the applications (200). In the example of FIG. 8, the execution priorities (142) of the applications (200) are stored in an execution priority table (140). Each record of the execution priority table (140) includes an application identifier (212) and the execution priority (142) for the associated application.

The method of FIG. 8 also includes ordering (800) additional power (802) upon reaching the predetermined power consumption threshold (604). The additional power (802) of FIG. 8 represents power for consumption by the compute nodes during execution of the applications (200) beyond the power consumed below the predetermined power consumption threshold (604). Ordering (800) additional power (802) according to the method of FIG. 8 may be carried out by ordering (800) additional power (802) based on any available price discounts. That is, the service node (116) may order (800) additional power in an amount that obtains one of the available price discounts.

The method of FIG. 8 includes establishing (804) a new predetermined power consumption threshold (806) in dependence upon the additional power (802) ordered. The service node (116) may establish (804) the new predetermined power consumption threshold (806) according to the method of FIG. 8 by calculating the new predetermined power consumption threshold (806) from the original predetermined power consumption threshold (604) and the additional power (802) ordered. The service node (116) may calculate the new predetermined power consumption threshold (806) as the original predetermined power consumption threshold (604) plus the additional power (802) ordered. In such a manner, the new predetermined power consumption threshold (806) establishes a new, larger power budget for the applications (200) than the original power budget for the applications (200).

Exemplary embodiments of the present invention are described largely in the context of a fully functional computer system for budget-based power consumption for application execution on a plurality of compute nodes. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of budget-based power consumption for application execution on a plurality of compute nodes, the method comprising:
   assigning an execution priority to each of one or more applications;
   executing, on the plurality of compute nodes, the applications according to the execution priorities assigned to the applications at an initial power level provided to the compute nodes until a predetermined power consumption threshold is reached; and
   applying, upon reaching the predetermined power consumption threshold, one or more power conservation actions to reduce power consumption of the plurality of compute nodes during execution of the applications, including assigning a new execution priority to one or more of the applications upon reaching the predetermined power consumption threshold.

2. The method of claim 1 wherein applying, upon reaching the predetermined power consumption threshold, one or more power conservation actions to reduce power consumption of the plurality of compute nodes during execution of the applications further comprises reducing the power provided to the plurality of the compute nodes upon reaching the predetermined power consumption threshold.

3. The method of claim 1 further comprising accepting a higher price for power than a current price upon reaching the predetermined power consumption threshold.

4. The method of claim 1 further comprising:
   ordering additional power upon reaching the predetermined power consumption threshold; and
   establishing a new predetermined power consumption threshold in dependence upon the additional power ordered.

5. The method of claim 1 wherein the plurality of compute nodes are connected for data communications using a plurality of data communications networks, at least one of the data communications networks optimized for point to point operations, and at least one of the data communications optimized for collective operations.

6. An apparatus for budget-based power consumption for application execution on a plurality of compute nodes, the apparatus comprising one or more computer processors and computer memory operatively coupled to the computer processors, the computer memory having disposed within it computer program instructions capable of:
   assigning an execution priority to each of one or more applications;
   executing, on the plurality of compute nodes, the applications according to the execution priorities assigned to the applications at an initial power level provided to the compute nodes until a predetermined power consumption threshold is reached; and
   applying, upon reaching the predetermined power consumption threshold, one or more power conservation actions to reduce power consumption of the plurality of compute nodes during execution of the applications, including assigning a new execution priority to one or more of the applications upon reaching the predetermined power consumption threshold.

7. The apparatus of claim 6 wherein applying, upon reaching the predetermined power consumption threshold, one or more power conservation actions to reduce power consumption of the plurality of compute nodes during execution of the applications further comprises reducing the power provided to the plurality of the compute nodes upon reaching the predetermined power consumption threshold.

8. The apparatus of claim 6 wherein the computer memory has disposed within it computer program instructions capable of accepting a higher price for power than a current price upon reaching the predetermined power consumption threshold.

9. The apparatus of claim 6 wherein the computer memory has disposed within it computer program instructions capable of:
   ordering additional power upon reaching the predetermined power consumption threshold; and
   establishing a new predetermined power consumption threshold in dependence upon the additional power ordered.

10. The apparatus of claim 6 wherein the plurality of compute nodes are connected for data communications using a plurality of data communications networks, at least one of the data communications networks optimized for point to point operations, and at least one of the data communications optimized for collective operations.

11. A computer program product for budget-based power consumption for application execution on a plurality of compute nodes, the computer program product disposed upon a computer readable, recordable storage medium, the computer program product comprising computer program instructions capable of:
   assigning an execution priority to each of one or more applications;
   executing, on the plurality of compute nodes, the applications according to the execution priorities assigned to the applications at an initial power level provided to the compute nodes until a predetermined power consumption threshold is reached; and
   applying, upon reaching the predetermined power consumption threshold, one or more power conservation actions to reduce power consumption of the plurality of compute nodes during execution of the applications, including assigning a new execution priority to one or more of the applications upon reaching the predetermined power consumption threshold.

12. The computer program product of claim 11 wherein applying, upon reaching the predetermined power consumption threshold, one or more power conservation actions to reduce power consumption of the plurality of compute nodes during execution of the applications further comprises reducing the power provided to the plurality of the compute nodes upon reaching the predetermined power consumption threshold.

13. The computer program product of claim 11 further comprising computer program instructions capable of accepting a higher price for power than a current price upon reaching the predetermined power consumption threshold.

14. The computer program product of claim 11 further comprising computer program instructions capable of:
   ordering additional power upon reaching the predetermined power consumption threshold; and
   establishing a new predetermined power consumption threshold in dependence upon the additional power ordered.

15. The computer program product of claim 11 wherein the plurality of compute nodes are connected for data communications using a plurality of data communications networks, at least one of the data communications networks optimized for point to point operations, and at least one of the data communications optimized for collective operations.

* * * * *